(12) United States Patent
West

(10) Patent No.: US 6,994,173 B2
(45) Date of Patent: Feb. 7, 2006

(54) METHOD OF DRILLING A BOREHOLE

(75) Inventor: Jerry R. West, Calhoun, GA (US)

(73) Assignee: ACT Technologies, Inc., Dalton, GA (US)

( * ) Notice: Subject to any disclaimer, the term of this patent is extended or adjusted under 35 U.S.C. 154(b) by 303 days.

(21) Appl. No.: 10/440,970

(22) Filed: May 19, 2003

(65) Prior Publication Data

US 2004/0231892 A1 Nov. 25, 2004

(51) Int. Cl.
*E21B 21/00* (2006.01)
*C09K 7/02* (2006.01)

(52) U.S. Cl. .......................... 175/72; 175/65; 507/103; 507/119; 507/131; 507/134; 507/135; 507/138; 507/139; 507/145

(58) Field of Classification Search ................ 166/294; 175/65, 72; 405/264; 507/103, 119, 131, 507/134, 135, 138, 139, 145
See application file for complete search history.

(56) References Cited

U.S. PATENT DOCUMENTS

| | | | | |
|---|---|---|---|---|
| 2,536,113 | A | * 1/1951 | Wagner | ...................... 507/113 |
| 3,841,419 | A | * 10/1974 | Russell | ........................ 175/40 |
| 4,608,182 | A | 8/1986 | Dickert, Jr. et al. | |
| 4,664,818 | A | 5/1987 | Halliday et al. | |
| 4,814,096 | A | 3/1989 | Evani | |
| 4,963,273 | A | * 10/1990 | Perricone et al. | ........... 507/136 |
| 5,198,415 | A | * 3/1993 | Steiger | ....................... 507/103 |
| 5,635,458 | A | * 6/1997 | Lee et al. | ..................... 507/240 |
| 5,686,396 | A | * 11/1997 | Hale et al. | ................... 507/136 |
| 6,123,159 | A | * 9/2000 | Brookey et al. | ............... 175/72 |
| 6,489,270 | B1 | * 12/2002 | Vollmer et al. | ............. 507/261 |
| 6,632,779 | B1 | * 10/2003 | Vollmer et al. | ............. 507/211 |
| 6,716,799 | B1 | * 4/2004 | Mueller et al. | ............. 507/138 |
| 6,806,235 | B1 | * 10/2004 | Mueller et al. | ............. 507/138 |
| 2003/0130133 | A1 | * 7/2003 | Vollmer | ...................... 507/100 |

OTHER PUBLICATIONS

Technical document; of ACT Technologies, Inc., dated May 6, 2003; 1pg.
Technical document of Baroid, a Halliburton Company, CON DET®; Copyright 1998, Revised Aug. 2000; 2pgs.
Technical document of Baroid, a Halliburton Company; EZ-MUD®; Copyright 1998; Revised Aug. 2000; 2 pgs.
Technical document of Chem-Add Enterprises Ltd.; CHEMFLOC PHPA; Edited Oct. 6, 1999; 1pg.
Technical document of Clearwater, Inc.; Clear drill 300; dated Mar. 1999; 1pg.
Chapter 4, Drilling Fluids, EM 1110-1-1906, dated Sep. 30, 1996; 11pgs.
Technical bulletin of Polymer Drilling Systems; undated, published prior to May 7, 2003; 10pgs.
Technical data sheet of Polymer Drilling Systems; Wetting Agent, undated; published prior to May 7, 2003; 1pg.
Technical data sheet of Polymer Drilling Systems; Super Mud, undated; published prior to May 7, 2003; 1pg.

* cited by examiner

*Primary Examiner*—George Suchfield
(74) *Attorney, Agent, or Firm*—Husch & Eppenberger, LLC; Dutro (Bruce) E. Campbell, II

(57) ABSTRACT

A method for drilling a borehole employing a drilling fluid including an additive comprising a glucose derivative with pH lowering acid, buffers and surface active agents. The drilling fluid additive preferably exhibits the following properties: activity of approximately 30%–45% in water solution; pH of about 4.5 to 5.5; a light amber to clear liquid appearance and a density of approximately 1.200 grams per cubic centimeter.

15 Claims, No Drawings

METHOD OF DRILLING A BOREHOLE

CROSS-REFERENCE TO RELATED APPLICATIONS

None.

STATEMENT REGARDING FEDERALLY SPONSORED RESEARCH OR DEVELOPMENT

Not Applicable.

FIELD OF THE INVENTION

This invention relates generally to a method of drilling a borehole and, more particularly, to a method including the step of providing an additive that reduces the viscosity of drilling fluid and minimizes borehole problems due to mechanical instability, allowing for a relatively high drilling rate.

BACKGROUND OF THE INVENTION

Most rotary drilling methods require the use of drilling fluids. Drilling fluids perform several functions. The primary functions include cleaning the cuttings from the face of the drill bit, transporting the cuttings to the ground surface, cooling the drill bit, lubricating the drill bit and increasing the stability of the borehole.

Compressed air, foam, clear water and water-based mud are four general types of drilling fluids. Air and water generally satisfy the primary functions of a drilling fluid. However, additives must often be added to these fluids to overcome specific downhole problems. Air with additives is generally referred to as "foam." A water-based drilling fluid with additives is commonly referred to as "drilling mud." Another type of drilling fluid is the oil-in-water or oil-based mud.

Aqueous clay-based drilling fluids or muds are well-known in the prior art, as are different additives. Such fluids are comprised basically of water; a clay such as bentonite or sepiolite; lignosulfonate; a base such as NaOH; a densifier such as barite, or barium sulfate and possibly a salt containing a cation such as sodium or potassium. Other aqueous ionic compounds such as NaCl may also be present. These fluids are suitable for drilling at a pH level from about 8 to 11.5.

Water-based muds, plus appropriate additives, more or less fulfill the primary functions of drilling fluids, as described above. However, the primary disadvantage of using drilling mud are: a large volume of drilling fluid (water) is required, and a high potential for hole erosion exists. Also, the flush or return velocity of the drilling fluid, coupled with its viscosity, is potentially hazardous to erodible materials in boreholes.

The most common additive to form a water-based mud is bentonite. Bentonite consists of finely ground sodium bentonite clay. When mixed with water, the resulting slurry has a viscosity greater than water, possesses the ability to suspend relatively coarse and heavy particles, and tends to form a thin, very low permeability cake on the walls of the borehole. Bentonite is generally available in a standard grade and a high yield grade, which contains organic polymers and generally produces the same viscosity as the standard grade, with about one-half the amount of bentonite. However, the standard grade bentonite may contain peptizing agents and organic additives that may be environmentally unacceptable in some applications.

Drilling muds have four basic properties that determine the behavior of the mud as a drilling fluid: viscosity, density, gel strength, and filtration. Simple field tests can be employed to test for viscosity and density. As a general rule, viscosity should be maintained as low as possible to provide the required hole stability and fluid loss control. Thin mud generally does the best job of cleaning the drill bit, but thick muds are needed to remove coarse gravel from the hole.

Density is defined as the weight per unit volume of drilling fluid. An increase in the density of the drilling mud is a measure of how much drilled material is being carried in suspension and re-circulated. Excess suspended solids are objectionable for several reasons. First, the cuttings are generally abrasive and increase wear on the mud pump, drill string and drill bit. Re-grinding of cuttings also tends to decrease the rate of drilling progress. A thicker filter cake will be formed on the walls of the borehole as a result of the higher concentration of solids. As a result of the higher hydrostatic pressure caused by the higher concentration of solids, hydraulic fracturing of the formation is likely to occur. Also, a denser fluid has greater buoyancy, thereby making it less likely that the cuttings will settle out in the mud pit.

Gel strength is the measure of the capability of a drilling fluid to hold particles in suspension after flow ceases. Gel strength results from the electrical charges on the individual clay platelets. In a bentonite mud in which the particles are completely dispersed, essentially all the bonds between particles are broken while the mud is flowing. When the mud pump is shut off and flow ceases, the attraction between clay particles causes the platelets to bond to each other. This coming together and bonding is termed flocculation. This edge to face flocculation results in an open card-house structure capable of suspending cuttings and sand and gravel particles. This property also suspends finely ground, high specific gravity material when high density drilling muds are required. The capability of keeping cuttings in suspension prevents sandlocking the tools in the borehole while drill rods are added to the string and minimizes sediment collecting in the bottom of the hole after reaming. A drawback to this property is that cuttings do not readily settle out of the drilling mud and may be re-circulated, thus resulting in grinding of particles by the drill bit, increased mud density, increased mud pump wear, and lower penetration rate.

Filtration refers to the ability of the drilling fluid to limit fluid loss to the formation by deposition of mud solids on the walls of the hole. During drilling operations, the drilling fluid tends to move from the borehole into the formation as a result of hydrostatic pressure which is greater in the hole than in the formation. As the flow of drilling fluid occurs, the drilling fluid solids are deposited on the walls of the borehole and thereby significantly reduce additional fluid loss. The solids deposit is referred to as a filter cake. The ideal filter cake is thin with minimum intrusion into the formation. The thickness of the filter cake for a particular mud is generally a function of the permeability of the formation. For example, the filter cake in a clay interval of the borehole would be thinner than in a sand interval. A thick filter cake has a number of disadvantages which include the possibility that the cake may be eroded by circulating drilling fluid, may cause the drill pipe to stick, or may cause reduced hydrostatic pressure and partial collapse of the walls of the borehole during tool removal. Also, the re-entry of drilling equipment into the borehole lined with a thick filter cake could result in a pressure surge with an accompanying increased potential for hydrofracture of the formation.

Water quality, method of mixing and mud pit design are important to the effective use of water-based drilling muds. Effective dispersion of and hydration of the drilling mud solids is dependent on proper mixing. Sprinkling or pouring the dry additives into the water and relying on the drill rig pump to mix will result in a lumpy mud with excessive additives for the mud properties achieved.

It is highly desirable to provide a method for drilling a borehole, including the step of providing an inexpensive additive for water-based drilling fluid or drilling mud that reduces the viscosity of drilling fluid or drilling mud, increases the stability of the borehole and/or reduces fluid loss.

SUMMARY OF THE INVENTION

An aspect of the present invention is to provide a method for stabilizing a borehole being drilled by operating a drilling means at high temperatures, including the step of providing a drilling fluid additive that increases the stability of the borehole.

A preferred embodiment of the present invention includes the step of adding a drilling fluid additive to water, wherein the additive includes a glucose derivative with pH lowering acid, at least one buffer and at least one surface active agent and stablizes the borehole, thereby leading to increased drilling rates, truer boreholes and less chance of encountering a stuck drill pipe. The glucose derivative may be sorbitol 70%, glycerine, or any other suitable glucose derivative. The pH lowering acid may be commercial grade citric acid, boric acid, oxalic acid or any other suitable pH lowering acid. Sodium polyacrylate, fatty acid soaps, fatty sulfates, fatty sulfonates, or any other agent that lowers surface tension may be used as the surface active agent.

The above-described additive was originally developed for an EVA latex application to stabilize against clay filler in latex and as a clay thinner. The unique property of this additive is its ability to wet out clay particles, which reduces viscosity and maintains a fluid liquid. This property is advantageous when drilling in clay soils or muds. Moreover, the additive does not raise the pH of clay compounds.

DETAILED DESCRIPTION

A drilling fluid additive utilized in performing the method of the present invention has been sold commercially as SFX 300 WETTER™, for use as a clay thinner. The additive includes a glucose derivative with pH lowering acid, buffers and surface active agents. The additive exhibits the following properties: activity of approximately 30–45% in water solution; pH of about 4.5 to about 5.5; a light amber to clear liquid appearance and a density of approximately 1.200 grams per cubic centimeter. Furthermore, the drilling fluid additive may be mixed with water at concentrations as low as 0.3%–0.5%.

The buffer may be urea. For example, the buffer may be urea containing at least 40% nitrogen.

We have discovered that this additive may be used to provide an inexpensive additive for water-based drilling fluid or drilling mud that reduces the viscosity of drilling fluid or drilling mud, increases the stability of the borehole and/or reduces fluid loss. Testing was conducted to demonstrate how a preferred embodiment of the method of the present invention, including the step of mixing the above-described additive in an amount of approximately 3% by volume of a clay/EVA latex compound, provides for latex viscosity stability. The test results were, as follows:

| Test | No Additive | 3% by volume |
|---|---|---|
| Initial Viscosity | 13,000 cps | 6,000 cps |
| Viscosity after 3 days | 30,000 cps (static) | 14,000 cps (static) |
| | 24,000 cps (stirred) | 9,000 cps (stirred) |

No significant viscosity changes were observed on the sample with the additive after the 3 day readings. The sample with no additive continued to increase in viscosity, resulting in erratic viscosity measurements because of the extremely high viscosity Surprisingly, the method of the present invention allows for the desired viscosity, while utilizing a significantly lower concentration of additive than what is typically called for by other known methods and additives.

As can be seen from the above test results, the preferred embodiment of the method of the present invention significantly lowered and stabilized viscosity, which is advantageous for drilling in clay soil or muds. When drilling a borehole by operating a drilling means, the preferred method allows for the additive to be inserted in the drill shaft and circulated therein with drilling fluid. The additive can be advantageously mixed with the drilling fluid (in a mixing tank for example) prior to insertion into the drill shaft.

Other objects, features and advantages will be apparent to those skilled in the art. While preferred embodiments of the present invention have been illustrated and described, this has been by way of illustration and the invention should not be limited except as required by the scope of the appended claims.

What is claimed is:

1. A method of drilling a borehole, including the steps of:
    (a) providing an additive comprising a glucose derivative, a pH lowering acid, at least one buffer and at least one surface active agent, wherein the step of providing the additive includes providing sorbitol 70% as the glucose derivative;
    (b) mixing said additive with over 99.5% water, by volume, to form a drilling fluid;
    (c) operating a drilling apparatus to drill a borehole; and
    (d) circulating the drilling fluid through the drilling apparatus and into the borehole to stabilize the borehole.

2. The method of claim 1, wherein the step of providing the additive includes providing a pH lowering acid that is an acid selected from the group consisting of citric acid, boric acid and oxalic acid.

3. The method of claim 1, wherein the step of providing the additive includes providing urea as the at least one buffer.

4. The method of claim 3, wherein the step of providing the additive includes providing urea that is at least 40% nitrogen as the at least one buffer.

5. The method of claim 1, wherein the step of providing the additive includes providing a surface active agent that is an agent selected from the group consisting of sodium polyacrylate, fatty acid soaps, fatty sulfates and fatty sulfonates.

6. The method of claim 1, wherein the step of mixing said additive with over 99.5% water, by volume, includes adding said additive at a concentration level of approximately 0.3%. to less than 0.5%.

7. The method of claim 1, wherein the step of providing the additive includes providing an additive having an activity of approximately 30% to 45% in water solution.

8. The method of claim 1, wherein the step of providing the additive includes providing an additive having a pH of approximately 4.5 to 5.5.

9. The method of claim 1, wherein the step of providing the additive includes providing an additive having a light amber appearance.

10. The method of claim 1, wherein the step of providing the additive includes providing an additive having a clear liquid appearance.

11. The method of claim 1, wherein the step of providing the additive includes providing an additive having a density of approximately 1.200 grams per cubic centimeter.

12. The method of claim 1, wherein the step of providing the additive includes providing an additive that exhibits the following properties:
   activity of approximately 30–45% in water solution; pH of about 4.5 to about 5.5; a light amber to clear a liquid appearance and a density of approximately 1.200 grams per cubic centimeter.

13. A method of drilling a borehole, including the steps of:
   (a) providing an additive comprising a glucose derivative, a pH lowering acid, at least one buffer and at least one surface active agent, wherein the step of providing the additive includes providing urea as the at least one buffer;
   (b) mixing said additive with over 99.5% water, by volume, to form a drilling fluid;
   (c) operating a drilling apparatus to drill a borehole; and
   (d) circulating the drilling fluid through the drilling apparatus and into the borehole to stabilize the borehole.

14. The method of claim 13, wherein the step of providing the additive includes providing urea that is at least 40% nitrogen as the at least one buffer.

15. A method of drilling a borehole, including the steps of:
   (a) providing an additive comprising a glucose derivative, a pH lowering acid, at least one buffer and at least one surface active agent, wherein the step of providing the additive includes providing an additive having a pH of approximately 4.5 to 5.5;
   (b) mixing said additive with over 99.5% water, by volume, to form a drilling fluid;
   (c) operating a drilling apparatus to drill a borehole; and
   (d) circulating the drilling fluid through the drilling apparatus and into the borehole to stabilize the borehole.

* * * * *